United States Patent
Higashi et al.

(10) Patent No.: US 7,704,481 B2
(45) Date of Patent: Apr. 27, 2010

(54) METHOD OF PRODUCING VAPOR-GROWN CARBON FIBERS

(75) Inventors: Tomoyoshi Higashi, Kawasaki (JP); Eiji Kambara, Kawasaki (JP); Katsuyuki Tsuji, Kawasaki (JP)

(73) Assignee: Showa Denko K.K., Tokyo (JP)

( * ) Notice: Subject to any disclaimer, the term of this patent is extended or adjusted under 35 U.S.C. 154(b) by 605 days.

(21) Appl. No.: 10/548,542

(22) PCT Filed: Apr. 22, 2004

(86) PCT No.: PCT/JP2004/005787

§ 371 (c)(1),
(2), (4) Date: Sep. 12, 2005

(87) PCT Pub. No.: WO2004/097084

PCT Pub. Date: Nov. 11, 2004

(65) Prior Publication Data

US 2006/0104888 A1    May 18, 2006

(30) Foreign Application Priority Data

Apr. 25, 2003    (JP) .............................. 2003-120877
Mar. 15, 2004    (JP) .............................. 2004-073131

(51) Int. Cl.
  *D01C 5/00*    (2006.01)
(52) U.S. Cl. ................... 423/447.3; 427/447.1
(58) Field of Classification Search .............. 423/447.1, 423/447.3
See application file for complete search history.

(56) References Cited

U.S. PATENT DOCUMENTS 5,102,647 A * 4/1992 Yamada et al. ........... 423/447.3
2004/0136895 A1   7/2004 Muramaki et al.

FOREIGN PATENT DOCUMENTS

| JP | 1-92423 A | 4/1989 |
| JP | 2521982 B2 | 5/1996 |
| JP | 2003-81620 A | 3/2003 |
| WO | WO 03/002789 A1 | 1/2003 |

OTHER PUBLICATIONS

Douglas, A Hierarchical Decision Procedure for Process Synthesis, AIChE Journal 1985; 31(3): 353-362.*

(Continued)

*Primary Examiner*—Stanley S. Silverman
*Assistant Examiner*—Daniel C. McCracken
(74) *Attorney, Agent, or Firm*—Sughrue Mion, PLLC (57) ABSTRACT

A method for producing vapor-grown carbon fibers, comprising contacting a carbon compound with a catalyst and/or a catalyst precursor compound in a heating zone, wherein the carbon compound is a combination of compounds respectively selected from carbon compounds having no benzene ring structure within molecule [Group (a)] and from aromatic compounds [Group (b)], these compounds satisfy the conditions that, in the raw materials, (number of atoms of element as catalyst)/(number of all carbon atoms) & equals; 0.000005 to 0.0015 and [number of carbon atoms contained in compound of Group (a)]/[number of carbon atoms contained in compound of Group (a)+number of carbon atoms contained in compound of Group (b)] & equals; 0.001 to 0.9, and the residence time in the temperature region of 600° C. or more is 30 seconds or less.

24 Claims, 4 Drawing Sheets

OTHER PUBLICATIONS

Wallenberger, et al., Strong, Pure, and Uniform Carbon Fibers Obtained Directly from the Vapor Phase, Science 1993; 260: 66-68.*

Vander Wal, et al., Ferrocene as a Precursor Reagent for Metal-Catalyzed Carbon Nanotubes: Competing Effects, Combustion and Flame 2002; 130: 27-36.*

Munehiro Ishioka, et al, "Formation of Vapor-Grown Carbon Fibers in $Co$-$Co_2$-$H_2$ Mixtures, I. Influence of Carrier Gas Composition", Carbon, vol. 30, No. 6, 1992, pp. 859-863, XP000294561.

Database WPI Section CH, Week 198920, Derwent Publications Ltd., London, GB; AN 1989-148418, XP002298903 & JP 01-092421 A (Nippon Kokan KK), Apr. 11, 1989, Abstract.

Munehiro Ishioka, et al, "Preparation of Vapor-Grown Carbon Fibers by Floating Catalyst Method in Linz-DonaWitz Converter Gas: Influence of Catalyst Size", Carbon, vol. 31, No. 5, 1993, pp. 699-703, XP000397368.

* cited by examiner

Fig.2

METHOD OF PRODUCING VAPOR-GROWN CARBON FIBERS

TECHNICAL FIELD

The present invention relates to a method for efficiently producing vapor-grown carbon fibers such as carbon nanotubes.

BACKGROUND ART

Heretofore, studies have been aggressively made on the carbon fibers obtained by the vapor-growth process (vapor-grown carbon fibers) because carbon fibers having a high aspect ratio can be relatively easily obtained, and many proposals have been reported also on the production method therefor. The carbon nanotubes (that is, carbon fibers having a fiber diameter on the nanometer order) which are, in particular, recently attracting attention can also be synthesized by applying this vapor-growth process.

Figure 1:
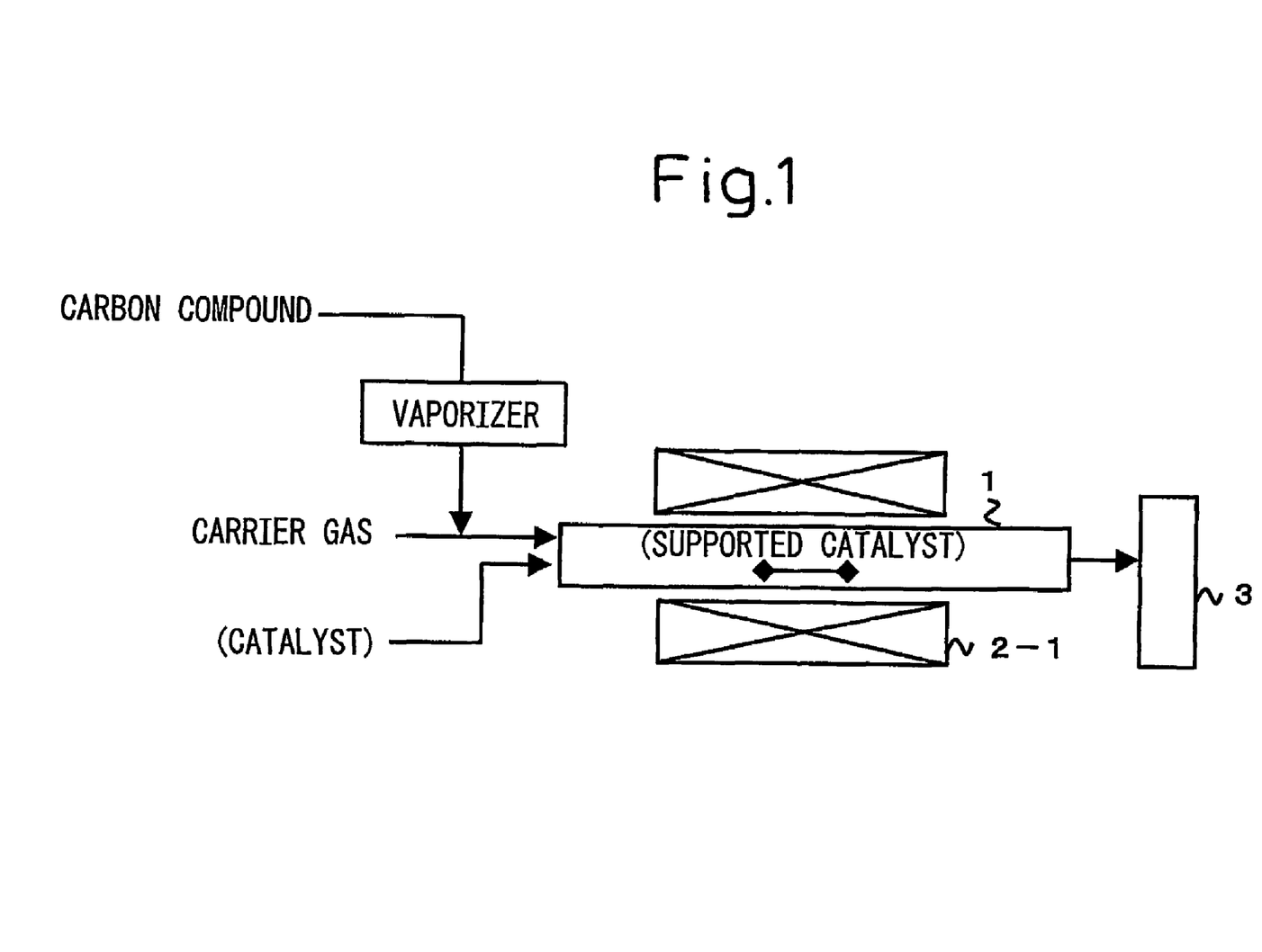
FIG. 1 is a schematic view showing a common example of a horizontal reaction apparatus for producing vapor-grown carbon fibers.

FIG. 1 is a schematic view showing one example of the reaction apparatus for continuously producing carbon fibers by the vapor-growth process. For example, in a general production method, carbon monoxide (CO), methane, acetylene, ethylene, benzene, toluene and the like are used as the starting material hydrocarbon. When the starting material hydrocarbon is a gas at an ordinary temperature, this is mixed, in the gas state, with a carrier gas and fed, whereas when it is a liquid, the starting material hydrocarbon is gasified, then mixed with a carrier gas and fed or is atomized in the liquid state in the heating zone. As the carrier gas, an inert gas such as nitrogen gas, a reductive hydrogen gas or the like is used. In some cases, the hydrocarbon is fed to a system depressurized to a vacuum. As the catalyst, a supported catalyst obtained by loading a metal on a support such as alumina, or an organic metal compound such as ferrocene is used. In the case of using a supported catalyst, the supported catalyst is previously disposed in the reaction zone and heated to perform a necessary pretreatment and, thereafter, the starting material hydrocarbon is fed and reacted (the case shown in FIG. 1), or the supported catalyst subjected to a pretreatment is continuously or intermittently fed, from outside the system, to perform the reaction. It is also possible to employ an organic metal compound readily dissolvable in the starting material hydrocarbon, such as ferrocene, as the catalyst precursor, continuously or intermittently feed it together with the starting material hydrocarbon to the heating zone, and produce a carbon fiber using, as the catalyst, the metal particle generated by the thermal decomposition of the catalyst precursor compound. The produced carbon fibers are collected in the inside of the heating zone and/or a collector 3 connected to the terminal of the heating zone at the terminal thereof and after the completion of reaction for a predetermined time, recovered.

The method for producing carbon fibers by the vapor-phase process is roughly classified into the following three types by the method of feeding a catalyst or a precursor compound for the catalyst:

(1) a method where a substrate or boat comprising alumina or graphite having supported thereon a catalyst or its precursor compound is placed in the heating zone and contacted with a hydrocarbon gas fed from the vapor phase;

(2) a method where particles of a catalyst or its precursor compound are dispersed in a liquid-state hydrocarbon or the like and continuously or pulsedly fed to the heating zone from outside of the system to contact with a hydrocarbon at a high temperature; and (3) a method where a metallocene or carbonyl compound dissolvable in a liquid-state hydrocarbon is used as a catalyst precursor compound and a hydrocarbon having dissolved therein the catalyst precursor compound is fed to the heating zone, thereby contacting a catalyst and a hydrocarbon at a high temperature.

In the method (1), the steps of coating a catalyst or its precursor on a substrate, performing, if desired, a pretreatment such as reduction, producing carbon fibers and taking out the carbon fibers after lowering the temperature must be separately performed and this makes continuous production difficult and has poor productivity. On the other hand, in the methods (2) and (3), continuous production can be performed and high productivity is obtained. Therefore, in the industry, a method classified into (2) or (3) is employed. However, unless a great excess of a catalyst or precursor compound thereof is used as compared with the amount necessary for growth of the product carbon fibers, a sufficiently large amount of carbon fibers cannot be obtained. Thus, at present, an expensive catalyst or catalyst precursor compound is wasted and, moreover, a step of removing by-products originated in the catalyst added in an excess amount is provided. This is serious when the catalyst is not supported on a support or the like but a catalyst, produced by feeding a catalyst precursor such as ferrocene to the heating zone in the gas state or in the state of floating in the raw material gas, is used. The catalyst having high activity is considered to cause aggregation and become bulky, and, as a result, to lose the ability of growing a carbon fiber.

When an inorganic or non-aromatic carbon compound such as CO, methane, acetylene and ethylene is used as the carbon source, such a compound is low in the carbon fiber-producing rate and the method of (1) is used in many cases, but the contacting time between the catalyst and the carbon source compound is as large as from a few minutes to tens of minutes and the productivity is low.

When an aromatic compound such as benzene and toluene is used as the carbon source, continuous production can be performed by the method of (2) or (3), but as described above, a great excess of a catalyst or precursor compound thereof is necessary and the efficiency in effective use of the catalyst or its precursor compound is low, giving rise to a high cost.

In the production of carbon fibers by the above-described methods, one carbon compound is generally used as the carbon source. Although ferrocene or thiophene is added in many cases, these are each used as a catalyst precursor or a precursor of sulfur and not expected to play only a role of a carbon source. A very large number of patent publications disclose that two or more carbon compounds can be used as the carbon source, but those specifically describing the effect, and Examples of two or more carbon compounds being used, can hardly be found. There is absolutely no related art clarifying the scientific advantage regarding the use of two or more carbon compounds.

For example, Japanese Examined Patent Publication (Kokoku) No. 2521982 discloses that carbon fibers are produced by using an exhaust gas from a coke furnace, which is considered to be a mixture of various carbon compounds. However, the purpose thereof is to effectively use the exhaust gas and the scientific activity when these compounds are mixed is not referred to at all.

Japanese Unexamined Patent Publication (Kokai) No. 2003-81620 discloses that acetylene, ethylene or butadiene is mixed as a carbon compound with an aromatic compound. According to this publication, the temperature of reaction system can be elevated by adding acetylene, ethylene or butadiene, but Examples where such a carbon compound is actually mixed are not found and also, the composite effect obtained by the presence of two carbon compounds together is not referred to at all.

An object of the present invention is to provide a production method of vapor-grown carbon fibers, where the efficiency in effective use of a catalyst or a catalyst precursor is remarkably enhanced and, as a result, carbon fibers can be simply and effectively produced at low cost.

SUMMARY OF THE INVENTION

As a result of intensive investigations to obtain the above-described object, the present inventors have found that when a mixture of Group (a): a carbon compound having no benzene ring structure and Group (b): an aromatic compound, is used for the carbon compound to serve as the starting material of carbon fibers, the reaction time is shortened and also, the efficiency in effective use of the catalyst or catalyst precursor is elevated. The present invention has been accomplished based on this finding. That is, according to the method of the present invention, even when a catalyst is used in an extremely small amount where fibers could be, heretofore, produced, a carbon fiber can be obtained with a high yield. Furthermore, carbon fibers can be obtained at a high productivity with a residence time far shorter than in the case of using only the compound of Group (a).

The mechanism of giving the effect of the present invention is not yet satisfactorily elucidated, but it is presumed to be as follows. The compound of Group (a) acts with a catalyst to start production of a fiber even in a low-temperature region (for example, from 600 to 1,000° C.) and when the produced fine fiber reaches a high-temperature region (for example, from 1,000 to 1,300° C.), the fiber is further grown in the thickness direction (diameter direction) by the compound of Group (b). By virtue of the presence of the compound belonging to Group (a), the production of fibers is started from the low-temperature region, that is, the production of fibers starts before the catalyst particles undergo aggregation and bulking to lose the catalytic ability, so that the efficiency in effective use of the catalyst or catalyst precursor is remarkably elevated. Then, the compound of Group (b) acts on the thus-produced fine fibers, whereby the growth of fibers effectively continues. In the case where only the compound of Group (a) is used, a fiber is produced but it grows slowly in the diameter direction and, as a result, the carbon fibers cannot be produced with good efficiency. However, by using both the compound of Group (a) and the compound of Group (b) in proper balance, the carbon fibers can be produced with good efficiency. On the other hand, when the compound of Group (b) is used alone, fibers are not satisfactorily produced in the low-temperature region and the catalyst is mostly aggregated and loses the catalytic ability and, as a result, carbon fibers cannot be obtained in a significant yield unless a large excess of a catalyst or catalyst precursor is fed.

That is, the present invention relates to the following [1] to [27].

[1] A method for producing vapor-grown carbon fibers, comprising contacting a carbon compound with a catalyst and/or a catalyst precursor compound in a heating zone to produce carbon fibers in a vapor phase, wherein the carbon compound is a combination of at least one compound selected from compounds in the following Group (a) and at least one compound selected from compounds in the following Group (b):

Compound of Group (a):
carbon compounds having no benzene ring structure within the molecule
Compound of Group (b):
aromatic compounds, the ratio of the number of atoms of an element of the catalyst in raw materials to the number of all the carbon atoms is:
(number of atoms of element of catalyst)/(number of all the carbon atoms)=0.000005 to 0.0015, the compound of Group (a) and the compound of Group (b) satisfy the condition:
[number of carbon atoms contained in compound of Group (a)]/[number of carbon atoms contained in compound of Group (a)+number of carbon atoms contained in compound of Group (b)]=0.001 to 0.9, and the residence time in a temperature region of 600° C. or more is 30 seconds or less.

[2] The production method of vapor-grown carbon fibers as described in [1] above, wherein the ratio of the number of atoms of an element as catalyst in raw materials to the number of all carbon atoms is:
(number of atoms of element as catalyst)/(number of all carbon atoms)=0.00001 to 0.001.

[3] The production method of vapor-grown carbon fibers as described in [1] above, wherein the ratio of the number of atoms of an element as catalyst in raw materials to the number of carbon atoms contained in the compound of Group (b) is:
(number of atoms of element as catalyst)/(number of carbon atoms contained in compound of Group (b))=0.000005 to 0.0015.

[4] The production method of vapor-grown carbon fibers as described in [3] above, wherein the ratio of the number of atoms of an element as catalyst in raw materials to the number of carbon atoms contained in the compound of Group (b) is:
(number of atoms of element as catalyst)/(number of carbon atoms contained in compound of Group (b))=0.00001 to 0.001.

[5] The production method of vapor-grown carbon fibers as described in [1] above, wherein the ratio of the number of atoms of an element as catalyst in raw materials to the number of carbon atoms contained in the compound of Group (a) is:
(number of atoms of element as catalyst)/(number of carbon atoms contained in compound of Group (a))=0.00001 to 0.1.

[6] The production method of vapor-grown carbon fibers as described in [5] above, wherein the ratio of the number of atoms of an element as catalyst in raw materials to the number of carbon atoms contained in the compound of Group (a) is:
(number of atoms of element as catalyst)/(number of carbon atoms contained in compound of Group (a))=0.0001 to 0.1.

[7] The production method of vapor-grown carbon fibers as described in [1] above, wherein the ratio of the number of atoms of an element as catalyst in raw materials to the number of carbon atoms contained in the compound of Group (b) is:
(number of atoms of element as catalyst)/(number of carbon atoms contained in compound of Group (b))=0.000005 to 0.0015, and the ratio of the number of atoms of an element as the catalyst in raw materials to the number of carbon atoms contained in the compound of Group (a) is:
(number of atoms of element as catalyst)/(number of carbon atoms contained in compound of Group (a))=0.00001 to 0.1.

[8] The production method of vapor-grown carbon fibers as described in [7] above, wherein the ratio of the number of atoms of an element as catalyst in raw materials to the number of carbon atoms contained in the compound of Group (b) is:
(number of atoms of element as catalyst)/(number of carbon atoms contained in compound of Group (b))=0.00001 to 0.001, and the ratio of the number of atoms of an element as the catalyst in the raw materials to the number of carbon atoms contained in the compound of Group (a) is:

(number of atoms of element as catalyst)/(number of carbon atoms contained in compound of Group (a))=0.0001 to 0.1.

[9] The production method of vapor-grown carbon fibers as described in [1] above, wherein the compound of Group (a) and the compound of Group (b) are fed to the heating zone of a reactor at a ratio satisfying the condition:

(number of carbon atoms contained in compound of Group (a))/(number of carbon atoms contained in compound of Group (a)+number of carbon atoms contained in compound of Group (b))=0.003 to 0.5.

[10] The production method of vapor-grown carbon fibers as described in [1] above, wherein the compound of Group (a) and the compound of Group (b) are fed to the heating zone of a reactor at a ratio satisfying the condition:

(number of carbon atoms contained in compound of Group (a))/(number of carbon atoms contained in compound of Group (a)+number of carbon atoms contained in compound of Group (b))=0.005 to 0.2.

[11] The production method of vapor-grown carbon fibers as described in any one of [1] to [10] above, wherein the compound of Group (a) is at least one compound selected from the group consisting of carbon monoxide, carbon dioxide, a saturated aliphatic compound and a saturated alicyclic compound.

[12] The production method of vapor-grown carbon fibers as described in any one of [1] to [10] above, wherein the compound of Group (a) is at least one compound selected from the group consisting of carbon monoxide, carbon dioxide, a saturated aliphatic hydrocarbon, a saturated aliphatic alcohol, a saturated aliphatic amine, a saturated aliphatic thiol, a saturated aliphatic ester, a saturated aliphatic ether, a saturated aliphatic aldehyde, a saturated aliphatic carboxylic acid, a saturated alicyclic hydrocarbon, a saturated alicyclic alcohol, a saturated alicyclic amine, a saturated alicyclic thiol, a saturated alicyclic ester, a saturated alicyclic ether, a saturated alicyclic aldehyde and a saturated alicyclic carboxylic acid.

[13] The production method of vapor-grown carbon fibers as described in any one of [1] to [10] above, wherein the compound of Group (a) has a boiling point (at 1 atm) of less than 180° C.

[14] The production method of vapor-grown carbon fibers as described in any one of [1] to [10] above, wherein the compound of Group (a) is at least one compound selected from the group consisting of carbon monoxide, carbon dioxide, methanol, ethanol, methane, ethane, propane and butane.

[15] The production method of vapor-grown carbon fibers as described in any one of [1] to [10] above, wherein the compound of Group (b) is at least one compound selected from aromatic hydrocarbons.

[16] The production method of vapor-grown carbon fibers as described in any one of [1] to [10] above, wherein the compound of Group (b) is at least one compound selected from the group consisting of benzene, toluene, xylene, ethylbenzene, styrene and cumene.

[17] The production method of vapor-grown carbon fibers as described in any one of [1] to [10], wherein the compound of Group (a) is at least one compound selected from the group consisting of carbon monoxide, carbon dioxide, methanol, ethanol and methane and the compound of Group (b) is at least one compound selected from the group consisting of benzene, toluene and xylene.

[18] The production method of vapor-grown carbon fibers as described in any one of [1] to [10] above, wherein raw materials pass through a low-temperature region of 600° C. to less than 1,000° C. and a high-temperature region of 1,000° C. or more.

[19] The production method of vapor-grown carbon fibers as described in [18] above, wherein the residence time of the raw material composition containing a carbon compound and a catalyst and/or a catalyst precursor compound in the low-temperature region is 0.5 seconds or more.

[20] The production method of vapor-grown carbon fibers as described in [18] above, wherein the compound of Group (a) is introduced into the low-temperature region and thereafter, the compound of Group (b) is introduced into the high-temperature region.

[21] The production method of vapor-grown carbon fibers as described in any one of [1] to [10] above, wherein the compound of Group (a), the compound of Group (b) and the catalyst precursor are fed each in the gas state to the heating zone.

[22] The production method of vapor-grown carbon fibers as described in any one of [1] to [10] above, wherein the catalyst precursor compound contains at least one metal selected from Groups 3, 5, 6, 8, 9 and 10 in the Periodic Table in which the groups are numbered 1 to 18.

[23] The production method of vapor-grown carbon fibers as described in any one of [1] to [10] above, wherein the gas after reaction is entirely or partially circulated and reused.

[24] The production method of vapor-grown carbon fibers as described in any one of [1] to [10] above, wherein carbon fibers having an average fiber diameter of 10 nm or more are produced.

[25] A vapor-grown carbon fiber produced by the production method described in any one of [1] to [10] above.

[26] The vapor-grown carbon fiber as described in [25] above, wherein the residual catalyst content is 5,000 ppm (wt) or less.

[27] The vapor-grown carbon fiber as described in [25] above, wherein the residual catalyst content is 500 ppm (wt) or less.

BRIEF DESCRIPTION OF THE DRAWINGS

This is also a schematic view showing the reaction apparatus used for producing vapor-grown carbon fibers in Examples 1 to 16 and Comparative Examples 1 and 2.

BEST MODES FOR CARRYING OUT THE INVENTION

The present invention is described in detail below, by referring to the drawings when necessary.

(Carbon Compound)

In the production method of carbon fibers of the present invention, the carbon compound (compound containing a carbon atom) as the starting material of the carbon fibers is a mixture of at least one compound selected from the following Group (a) and at least one compound selected from the following Group (b):

Group (a):
carbon compounds having no benzene ring structure within the molecule, and Group (b):
aromatic compounds.

The first requirement for the compound of Group (a) is that it is a compound having no benzene ring within the molecule. The benzene ring as used herein includes a condensed ring such as naphthalene or an anthracene skeleton condensed with benzene. A so-called heterocyclic ring where a part of carbon atoms on the benzene ring is substituted by oxygen, nitrogen, sulfur or the like, such as furan, pyridine and thiophene, is regarded as a benzene ring or a condensed ring and must not be contained as a unit of the compound of Group (a).

As a general understanding, a carbon fiber is produced when a carbon species produced upon decomposition of a carbon compound is dissolved or solid-dissolved in a catalyst in a heating zone and precipitates. The function required of the compound of Group (a) is to readily undergo hydrogenolysis and change into a carbon species easily dissolvable in a catalyst. Therefore, a compound having a benzene skeleton within the molecule, which is, as-is, hardly dissolved in a catalyst, is not suitable.

Examples of the compound of Group (a) include carbon monoxide, carbon dioxide, aliphatic compounds and alicyclic compounds. The aliphatic compound and alicyclic compound are an aliphatic hydrocarbon, an alicyclic hydrocarbon or a derivative thereof and these are a compound having no benzene ring or no condensed ring within the molecule. The aliphatic hydrocarbon and alicyclic hydrocarbon are preferably a saturated aliphatic or alicyclic hydrocarbon rather than an unsaturated one. The reason for the preference of a saturated aliphatic or alicyclic hydrocarbon is because the hydrogenolysis and change into a carbon species easily dissolvable in a catalyst are considered to readily take place. The compound of Group (a) may contain an element other than carbon and hydrogen, such as nitrogen, phosphorus, oxygen, sulfur, fluorine, chlorine, bromine and iodine.

In order to satisfactorily bring out the effect of the present invention, the compound of Group (a) is preferably mixed uniformly with a catalyst or catalyst precursor in the low-temperature region. For uniformly mixing in the low-temperature region with a catalyst or catalyst precursor in the gas state or in the state of floating in the raw material gas, the compound of Group (a) must be gasified and therefore, a readily gasifiable compound is preferred. Furthermore, the compounds of Group (a) and Group (b) are preferably fed to the heating zone after thoroughly mixing these compounds and for realizing this, the compounds of Group (a) and Group (b) are most preferably mixed each in the gasified state. Accordingly, the compound of Group (a) preferably has a boiling point of less than 180° C., more preferably less than 80° C., still more preferably less than 60° C., and most preferably less than 20° C., under atmospheric pressure (1 atm).

In this meaning, examples of the compound of Group (a) include an inorganic gas such as carbon monoxide and carbon dioxide; alkanes having from 1 to 8 carbon atoms; and cycloparaffins having from 3 to 8 carbon atoms.

Preferred examples of the compound of Group (a) include an inorganic gas such as carbon monoxide and carbon dioxide; alkanes such as methane, ethane, propane, butane, pentane, hexane, heptane and octane; and cycloparaffins such as cyclopropane, cyclopentane and cyclohexane.

Also, derivatives where oxygen, nitrogen, sulfur, phosphorus, halogen or the like is contained in these hydrocarbons, for example, oxygen-containing compounds such as methanol, ethanol, propanol and butanol, sulfur-containing aliphatic compounds such as methyl thiol, methyl ethyl sulfide and dimethyl thioketone, and halogenated hydrocarbons such as chloroform, carbon tetrachloride and chloroethane, may be used.

More preferred examples of the compound of Group (a) include carbon monoxide, carbon dioxide, methanol, ethanol, methane, ethane, propane and butane, and most preferred examples of the compound of Group (a) include carbon monoxide, carbon dioxide, methanol, ethanol and methane.

The aromatic compound of Group (b) is an aromatic hydrocarbon or a derivative thereof and includes all compounds having a benzene ring. The compound of this group is preferably an aromatic hydrocarbon but may contain an element other than carbon and hydrogen, such as nitrogen, phosphorus, oxygen, sulfur, fluorine, chlorine, bromine and iodine. The function required of the compound of Group (b) is to deposit on the produced carbon fiber and grow the carbon fiber in the diameter direction by undergoing carbonization. A compound having a benzene ring within the molecule is suitable.

Preferred examples of the compound of Group (b) include monocyclic aromatic hydrocarbons such as benzene, toluene, xylene, styrene, ethylbenzene and cumene; and polycyclic compounds having a condensed ring, such as indene, naphthalene, anthracene and phenanthrene.

As the aromatic compound of Group (b), its derivatives containing oxygen, nitrogen, sulfur, phosphorus, halogen or the like, for example, a sulfur-containing aromatic compound such as phenylthiol and diphenylsulfide, may also be used. Although an aromatic compound having a high boiling point may also be used, a readily gasifiable compound is advantageous for the thorough mixing with the compound of Group (a) and a compound having a relatively low boiling point is preferred.

In this meaning, particularly preferred examples of the compound of Group (b) include benzene, toluene, xylene, ethylbenzene, styrene and cumene.

In the present invention, an essential requirement is to use the compound of Group (a) and the compound of Group (b) in combination. When an aromatic compound having an alkyl group, such as toluene and ethylbenzene, is used as the compound of Group (b), this compound decomposes in the heating zone or the preceding temperature-elevating process and the alkyl group or the like substituting on the benzene ring is expected to provide the same effect as the compound of Group (a). However, when only ethylbenzene is fed, as verified in Comparative Example 2 later, the effect of the present invention cannot be realized. In other words, the requirements of the present invention cannot be satisfied by feeding compounds of giving the compounds of Group (a) and Group (b) as a result of decomposition or the like. It is a substantial requirement of the present invention to provide the compound of Group (a) and the compound of Group (b) to a reactor having a portion heated to a temperature of approximately from 600 to 1,350° C.

The ratio of the compound of Group (a) to the compound of Group (b) used is preferably (number of carbon atoms contained in compound of Group (a))/(number of carbon atoms contained in compound of Group (a)+number of carbon atoms contained in compound of Group (b))=0.001 to 0.9, more preferably (number of carbon atoms contained in compound of Group (a))/(number of carbon atoms contained in compound of Group (a)+number of carbon atoms contained in compound of Group (b))=0.003 to 0.5, still more preferably (number of carbon atoms contained in compound of Group (a))/(number of carbon atoms contained in compound of Group (a)+number of carbon atoms contained in compound of Group (b))=0.005 to 0.2. The compound of Group (a) provides an effect even when added in a small amount, but if excessively small, a non-fibrous solid matter is readily produced and the ratio of fiber decreases. On the other hand, even if carbon monoxide or the like is used in a large amount as the compound of Group (a), the productivity does not increase and the yield extremely decreases. Therefore, the above-described range is preferred.

For example, when ethylene as the compound of Group (a) and benzene as the compound of Group (b) are continuously added at a rate of 0.4 mmol/min and 1.20 mmol/min, respectively, to the heating zone of a reactor, the feeding rate of carbon atoms contained in the compound of Group (a) is 0.8 mmol/min (as the number of carbon atoms in ethylene is 2, 0.4×2=0.8), the feeding rate of carbon atoms contained in the compound of Group (b) is 7.20 mmol/min (since the number of carbon atoms in benzene is 6, 1.20×6=7.20), and the (number of carbon atoms contained in compound of Group (a))/(number of carbon atoms contained in compound of Group (a)+number of carbon atoms contained in compound of Group (b))=0.1 (0.8/(0.8+7.2)).

(Catalyst)

The catalyst for use in the present invention is not particularly limited as long as it is a substance of accelerating the growth of a carbon fiber. Examples of this catalyst include at least one element selected from the group consisting of Groups 3 to 12 in the 18 Groups-type Period Table of Elements recommended by IUPAC in 1990. At least one metal selected from the group consisting of Groups 3, 5, 6, 8, 9 and 10 is preferred, and iron, nickel, cobalt, ruthenium, rhodium, palladium, platinum and rare earth elements are more preferred.

(Catalyst Precursor Compound)

The catalyst precursor compound is a compound of undergoing thermal decomposition on heating and depending on the case, further being reduced to give the above-described catalyst. For example, ferrocene as a catalyst precursor compound thermally decomposes under heat to produce an iron fine particle which is a catalyst. Accordingly, the catalyst precursor compound which can be preferably used includes compounds of giving the above-described metals. More specifically, for example, the catalyst precursor compound is preferably a metal compound containing at least one element selected from the group consisting of Groups 3 to 12, more preferably a compound containing at least one element selected from the group consisting of Groups 3, 5, 6, 8, 9 and 10, and most preferably a compound containing iron, nickel, cobalt, ruthenium, rhodium, palladium, platinum or a rare earth element.

Also, a metal compound containing at least one element selected from the group consisting of Groups 1 to 17 may be added to the above-described main component as a catalyst modification component (so-called, co-catalyst) to modify the catalytic performance of the main component metal.

(Support)

The catalyst and/or catalyst precursor compound may also be used, if desired, by loading it on a support. The support is preferably a compound stable in the heating zone and examples of this compound include alumina, silica, zeolite, magnesia, titania, zirconia, graphite, active carbon and carbon fiber.

(Amount Used of Catalyst, Etc.)

The amount of the catalyst or catalyst precursor compound used is, in terms of a ratio of the number of atoms of an element (for example, Fe) as the catalyst [i.e., an element working out to the catalyst] to the number of carbon atoms in the carbon compounds as raw materials (that is, the number of all carbon atoms in raw materials such as carbon compounds), preferably from 0.000005 to 0.0015, more preferably from 0.00001 to 0.001, still more preferably from 0.0001 to 0.0005, and most preferably from 0.0002 to 0.0004. If this ratio is less than 0.000005, the amount of catalyst is too small and this disadvantageously causes decrease in the number of fibers or increase in the fiber diameter, whereas if the ratio exceeds 0.0015, this is not preferred not only in view of profitability but also because the bulked catalyst particle, not functioning as the catalyst, is mixed into the fiber. Incidentally, in the above-described calculation of the number of all carbon atoms in raw materials, the number of all carbon atoms is calculated by including not only carbon atoms in the carbon compound but also those derived from the catalyst precursor compound, addition components such as co-catalyst and support, and the solvent.

The ratio of the number of atoms of an element as the catalyst to the number of carbon atoms contained in the compound of Group (a) is preferably (number of atoms of element as catalyst)/(number of carbon atoms contained in compound of Group (a))=0.00001 to 0.1, more preferably (number of atoms of element as catalyst)/(number of carbon atoms contained in compound of Group (a))=0.0001 to 0.1, still more preferably (number of atoms of element as catalyst)/(number of carbon atoms contained in compound of Group (a))=0.0001 to 0.01. If the compound of Group (a) is excessive based on the catalyst, the compound of Group (a) not acting on the catalyst in the low-temperature region increases. The compound of Group (a) reaching to the high-temperature region without acting on a catalyst scarcely contributes to the production or growth of a fiber and if this increases, a part thereof becomes a non-fibrous, for example, spherical solid product. On the other hand, if the ratio of the compound of Group (a) is too small, based on the catalyst, the aggregation of catalyst cannot be satisfactorily prevented and this causes low efficiency in the use of the catalyst and the production of fibers in a small amount. Depending on the case, the compound of Group (b) not used for growth of a fiber in the high-temperature region is mixed as a non-fibrous, for example, spherical solid product.

The ratio of the number of atoms of an element as the catalyst to the number of carbon atoms contained in the compound of Group (b) is preferably (number of atoms of element as catalyst)/(number of carbon atoms contained in compound of Group (b))=0.000005 to 0.0015, more preferably (number of atoms of element as catalyst)/(number of carbon atoms contained in compound of Group (b))=0.00001 to 0.001, still more preferably (number of atoms of element as catalyst)/(number of carbon atoms contained in compound of Group (b))=0.00005 to 0.001. If the compound of Group (b) is excessive based on the catalyst, the compound of Group (b) abruptly undergoes decomposition or carbidation in the high-temperature region to cause production of a non-fibrous, for example spherical, solid product in addition to the growth of fiber, whereas if the ratio of the compound of Group (b) is too small based on the catalyst, the produced carbon fiber cannot satisfactorily grow and, as a result, the yield does not increase and the productivity is low.

Preferably, the ratio of the number of atoms of an element as the catalyst in raw materials to the number of carbon atoms contained in the compound of Group (b) is (number of atoms of element as catalyst)/(number of carbon atoms contained in compound of Group (b))=0.000005 to 0.0015 and at the same time, the ratio of the number of atoms of an element as catalyst in raw materials to the number of carbon atoms contained in the compound of Group (a) is (number of atoms of element as catalyst)/(number of carbon atoms contained in compound of Group (a))=0.00001 to 0.1. More preferably, the ratio of the number of atoms of an element as the catalyst in raw materials to the number of carbon atoms contained in the compound of Group (b) is (number of atoms of element as catalyst)/(number of carbon atoms contained in compound of Group (b))=0.00001 to 0.001 and at the same time, the ratio of the number of atoms of an element as the catalyst in raw materials to the number of carbon atoms contained in the compound of Group (a) is (number of atoms of element as catalyst)/(number of carbon atoms contained in compound of Group (a))=0.0001 to 0.1.

(Feeding Method for Raw Materials)

The method for feeding raw materials is not particularly limited. The compound of Group (a), the compound of Group (b) and the catalyst and/or catalyst precursor compound all may be gasified and fed in the gas state, or a part or all of these may be fed in a liquid state. Among these compounds, the compound of Group (a) and the catalyst and/or catalyst precursor compound may be first fed and the compound of Group (b) may be fed on the way in the reaction system, but these are preferably fed at the same time. However, in one preferred embodiment, the compound of Group (a) and the catalyst and/or catalyst precursor compound may be first fed to a low-temperature zone which is described later and the compound of Group (b) may be fed to a high-temperature zone which is described later. If the compound of Group (a), the compound of Group (b) and a carrier gas or the like described below are insufficiently mixed, a portion having a low concentration of the compound of Group (a) or a portion having a high concentration of the compound of Group (b) is generated in the reaction system and the effect of the compound of Group (a) is weakened. Accordingly, these raw materials are more preferably gasified and thoroughly mixed as gaseous materials before introducing these into the heating zone and, thereafter, are fed to the heating zone.

(Carrier Gas)

In the production of vapor-grown carbon fibers of the present invention, use of a carrier gas in addition to these components is recommended. As the carrier gas, hydrogen, nitrogen, helium, argon, krypton or a mixed gas thereof may be used. However, a gas containing an oxygen molecule (namely, oxygen in the molecular state: $O_2$), such as air, is not suitable. The catalyst precursor compound for use in the present invention is sometimes in an oxidized state and in such a case, a gas containing hydrogen is preferably used as the carrier gas. Accordingly, the carrier gas is preferably a gas containing hydrogen in an amount of 1 vol % or more, more preferably 30 vol % or more, and most preferably 85 vol % or more, and this is, for example, 100 vol % hydrogen or a gas obtained by diluting hydrogen with nitrogen.

(Sulfur Compound)

In the production of vapor-grown carbon fibers of the present invention, a sulfur compound having an effect in the control of a carbon fiber diameter may be used in combination. A compound such as sulfur, thiophene and hydrogen sulfide may be fed in the gas state or after dissolving it in a solvent. Of course, a sulfur-containing substance may be used in the compound of Group (a), compound of Group (b) or catalyst precursor compound. The total molar number of sulfur fed is suitably 1,000 times or less, preferably 100 times or less, more preferably 10 times or less, the molar number of an element as the catalyst. If the amount of sulfur fed is excessively large, this is disadvantageous not only in view of profitability but also because the growth of a carbon fiber is inhibited.

(Synthesis of Carbon Fiber)

The synthesis of a vapor-grown carbon fiber is achieved by feeding the above-described raw materials and if desired, a carrier gas to the heating zone and contacting these under heating. The reactor (heating furnace) is not particularly limited as long as a predetermined residence time and heating temperature can be obtained, but a vertical or horizontal tube furnace is preferred in view of feed of raw materials and control of the residence time.

The temperature in the heating zone greatly varies depending on the kind of carbon compound. Generally, the temperature is preferably from 500 to 1,500° C., more preferably from 800 to 1,350° C. If the temperature is too low, a carbon fibers do not grow, whereas if excessively high, carbon fibers do not grow or only a thick fiber can be obtained.

In the present invention, the compound of Group (a) and the compound of Group (b) are used in combination as the carbon source. The compound of Group (a) and the compound of Group (b) are differ in the temperature contributing the production or growth of a carbon fiber. Accordingly, although not limited, the temperature in the heating zone is not constant and a high-temperature region where the compound of Group (b) acts is preferably provided after a low-temperature region where the compound of Group (a) acts. Examples of the temperature profile of two temperature zones include a profile having two heating zones of low-temperature region and high-temperature region, and a profile where a temperature gradient from a low-temperature region to a high-temperature region is provided and the temperature is gradually elevated.

The low-temperature region is a temperature region where the compound of Group (a) efficiently acts on the catalyst, and the temperature in this range is preferably from 600 to 1,000° C., more preferably from 700 to 1,000° C. If this temperature is too low, the compound of Group (a) may not act on the catalyst or even if acts, the reaction rate is low and a carbon fiber cannot be satisfactorily produced, whereas if the temperature is excessively high, the catalyst is mostly aggregated and the efficiency in effective use of the catalyst decreases and, as a result, a product in a state other than a fiber, for example, a spherical product, is produced in a large amount.

The high-temperature region is a temperature region where the compound of Group (b) efficiently acts on a carbon fiber to grow the carbon fiber, and the temperature in this region is preferably from 1,000 to 1,500° C., more preferably from 1,000 to 1,350° C. If this temperature is too low, the compound of Group (b) undergoes no decomposition and does not contribute to the growth of a fiber, whereas if the temperature is excessively high, the compound of Group (b) abruptly decomposes and a product other than a fiber, for example, a spherical product, is produced in a large amount.

The residence time in the low-temperature region is preferably 0.1 second or more, more preferably 0.5 seconds or more, still more preferably 1.0 second or more. If this time is too short, carbon fibers may not grow satisfactorily. The residence time in the high-temperature region is preferably from 0.0001 to 60 seconds, more preferably from 0.001 to 30 seconds, and most preferably from 0.01 to 15 seconds. If the residence time is too short, carbon fibers do not grow, whereas if too long, only thick fibers can be obtained in some cases. In the present invention where carbon fibers can be obtained in a high yield and a high productivity with a short residence time, a long residence time is not preferred.

The residence time is adjusted by the length of the heating zone and the flow rate of the carrier gas. The residence time greatly varies depending on the reaction apparatus and the kind of carbon compound used. If the residence time is too short, carbon fibers do not grow, whereas if too long, only thick fibers can be obtained, in some cases.

In the present invention, the total residence time of the low-temperature and high-temperature regions, namely, the residence time in the temperature region of 600° C. or more, is preferably from 0.1 to 30 seconds, more preferably from 0.5 to 30 seconds, and most preferably from 1.0 to 16 seconds.

The residence time in the temperature region of 600° C. or more is a time period where the reaction gas is heated to elevate the temperature from a temperature in the low-temperature region exceeding 600° C. to the temperature in the high-temperature region and thereafter, cooled to less than 600° C. The residence time in the low-temperature region is a time period, in the temperature rising, from a point where the temperature exceeds 600° C. until it exceeds 1,000° C., and the residence time in the high-temperature region is a time period from a point where the temperature exceeds 1,000° C. until it is lowered to less than 1,000° C.

The reaction in the low-temperature region and the reaction in the high-temperature region may also be performed separately. In this case, the residence time in the low-temperature region is a sum of the time period from a point where the temperature exceeds 600° C., the temperature is kept at 1,000° C. or less, until the temperature lowers to less than 600° C. for the reaction in the low-temperature region, and the time period from a point where the temperature exceeds 600° C. until it exceeds 1,000° C. at the temperature-rising for the reaction in the high-temperature region. The total residence time in the low-temperature and high-temperature regions is a sum of time periods where the reaction gas is 600° C. or more at both the reaction in the low-temperature region and the reaction in the high-temperature region.

The reaction for producing carbon fibers is usually performed in one reaction tube. In this case, when the flow rate is constant, the residence time can be adjusted by changing the flow velocity (namely, changing the diameter of the reaction tube) or changing the length of the heating zone.

When the residence time in the high-temperature region is sufficiently long and the compound of Group (b) is almost all decomposed, the main component of the carbon compound in the gas after reaction is methane or ethylene. In the case where an oxygen-containing compound is contained in the reaction gas, carbon monoxide or carbon dioxide is additionally present. Even in the case where the compound of Group (b) is insufficiently decomposed, the main component in the gas produced by the decomposition is the same as in (1) above. The gas after reaction can be entirely or partially circulated and reused by again feeding the gas as it is or after adding the compound of Group (a) and/or the compound of Group (b), to the heating zone. In the case of circulating and reusing the gas after reaction, the amount of the compound of Group (a), the compound of Group (b) or the like in raw materials is a total of the amount contained in the circulated and reused gas and the amount newly added.

Figure 2:
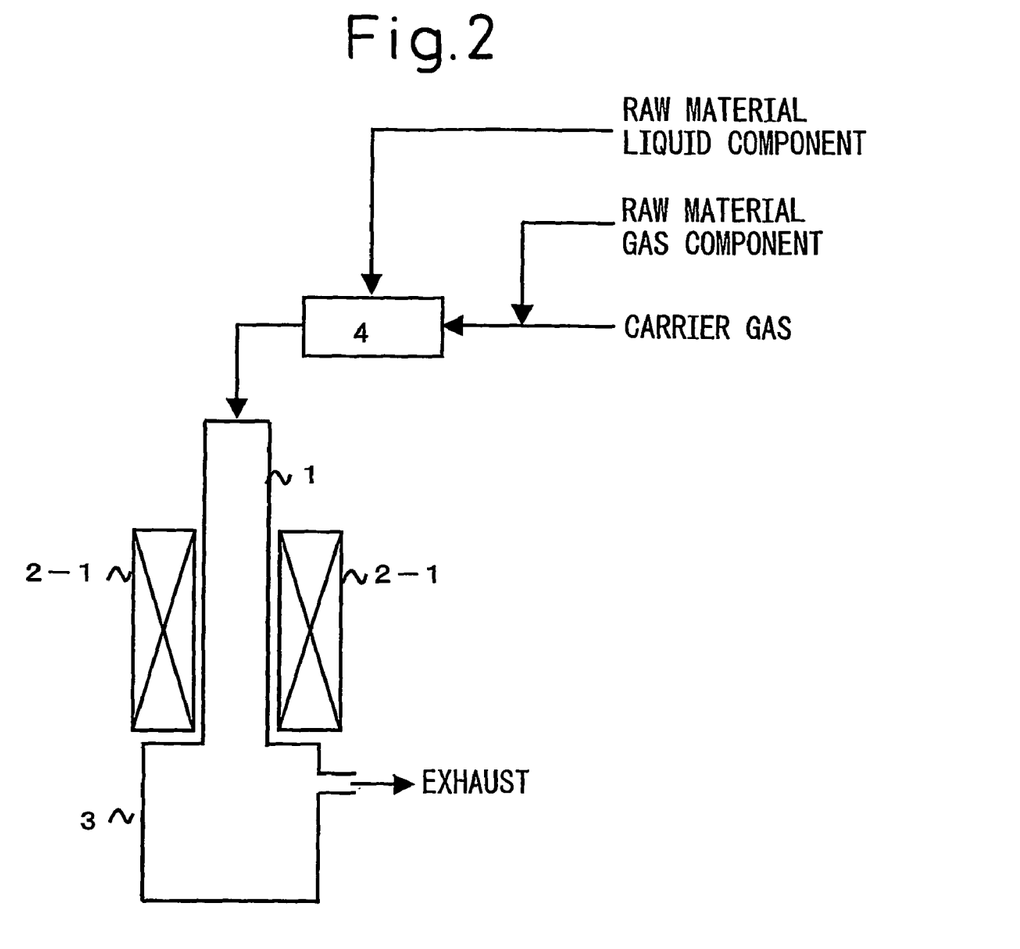
FIG. 2 is a schematic view showing one example of a vertical reaction apparatus equipped with one furnace for producing vapor-grown carbon fibers.

FIG. 2 shows one example of a reaction apparatus, where a heater 2-1 is equipped, lines for introducing the carrier gas, the compound of Group (a), the compound of Group (b) and the catalyst or catalyst precursor compound are provided at the upper part, and a receiver for collecting produced carbon fibers is provided at the lower part. Using such an apparatus, the heater 2-1 is set to a predetermined temperature in the high-temperature region and the residence time in the low-temperature region which the reaction gas introduced into the reaction furnace passes through during the temperature elevation of the reaction gas from room temperature to the predetermined temperature in the high-temperature region, is controlled to satisfy the above-described conditions, for example, by adjusting the flow rate of the reaction gas.

Figure 3:
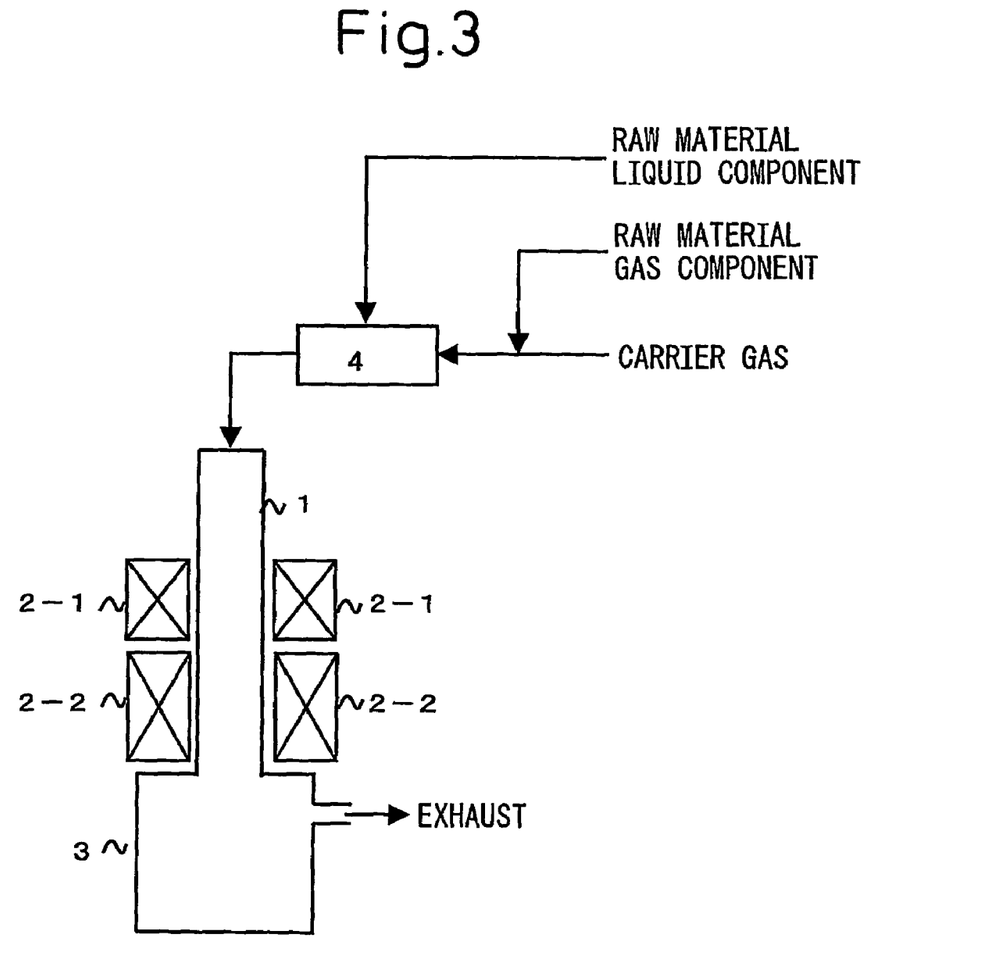
FIG. 3 is a schematic view showing one example of a vertical reaction apparatus equipped with two furnaces for producing vapor-grown carbon fibers.

In the present invention, two temperature zones of low-temperature region and high-temperature region are preferably provided separately and for this purpose, a reaction apparatus shown in FIG. 3 can also be used, where a heater 2-1 and a heater 2-2 capable of independently controlling respective temperature zones are equipped. In this case, the heater 2-1 is set to a predetermined temperature in the low-temperature region, the heater 2-2 is set to a predetermined temperature in the high-temperature region, and a mixed gas containing the carrier gas, the compound of Group (a), the compound of Group (b), the catalyst or catalyst precursor compound and the like is passed into the reaction apparatus, whereby carbon fibers can be obtained. In FIG. 3, the heater 2-1 and the heater 2-2 are continuously disposed, but it may also be possible that the heaters are separately disposed and after passing the heater 2-1, the gas temperature is once lowered to a temperature lower than the low-temperature region and thereafter, the gas is heated to the temperature in the high-temperature region by the heater 2-2.

The characteristic feature of the present invention is to efficiently recover the carbon source as carbon fibers. The mechanism thereof basically resides in that fibers produced upon contact of, mainly, the compound of Group (a) with the catalyst are effectively grown in the diameter direction by using mainly the compound of Group (b) as the carbon source. Accordingly, the present invention is not suited for the production of carbon fibers having an extremely small outside diameter, such as single/or dual wall/carbon nanotubes, but very suited rather for the production of relatively thick carbon fibers. That is, the present invention is optimal as a production method of carbon fibers having an average outside diameter of 10 nm or more, preferably 50 nm or more, more preferably 80 nm or more, and most preferably 100 nm or more. The outside diameter of carbon fibers as used herein can be determined, for example, by measuring outside diameters of about 100 fibers from an SEM image. The outside diameter can also be calculated by assuming a cylindrical body from a BET specific surface area.

According to the present invention, the efficiency in use of the catalyst or catalyst precursor can be remarkably enhanced. In other words, carbon fibers can be efficiently obtained even with a small catalytic amount. In the carbon fibers produced by a normal method, a catalyst (e.g., iron) of about 50,000 wt ppm remains. To improve the physical properties of the produced carbon fibers, baking (about 1,500° C.) or a graphitization treatment (2,000 to 3,000° C.) in an inert gas is applied. In this treatment, the iron or the like as the catalyst is partially vaporized or transpired and, as a result, the residual amount of catalyst in the carbon fibers after graphitization decreases. On the other hand, according to the production method of the present invention, the content of the catalyst contained in the carbon fibers can be extremely reduced even in the state of being not subjected to a treatment such as baking or graphitization. Carbon fibers having a catalyst content, in the state of being not subjected to a treatment such as baking or graphitization, of 5,000 ppm or less, even 500 ppm or less under preferred conditions, can be obtained and depending on use, the graphitization treatment can be dispensed with.

In the method of the present invention, the average outside diameter of fibers obtained tends to vary by changing the ratio of the number of carbon atoms contained in the compound of Group (a) to the number of carbon atoms contained in the compound of Group (b). That is, the fiber diameter becomes small when the ratio of the number of carbon atoms contained in the compound of Group (a) is increased, whereas the fiber diameter becomes large when the ratio is decreased. This reveals that the average outside diameter of obtained fibers can be controlled merely by changing only the composition of the starting material carbon compound without meticulously changing the reaction apparatus or conditions. For example, carbon fibers having a fiber outer diameter of 80 to 150 nm can be very simply and easily produced.

EXAMPLES

The present invention is described in greater detail below by referring to Examples, however, the present invention is not limited thereto.

The reagents and the like used in Examples and Comparative Examples are as follows.

[Reagents]

1. Compound of Group (a)

Carbon monoxide: produced by Japan Oxygen Co., Ltd.

Carbon dioxide: produced by Sagami Acetylene K.K.

Methane: produced by Takachiho Shoji K.K.

Ethylene: produced by Japan Oxygen Co., Ltd.

Methanol: produced by Wako Pure Chemical Industries, Ltd.

Ethanol: produced by Wako Pure Chemical Industries, Ltd.

2. Compound of Group (b)

Benzene: produced by Wako Pure Chemical Industries, Ltd.

Toluene: produced by Wako Pure Chemical Industries, Ltd.

p-Xylene: produced by Wako Pure Chemical Industries, Ltd.

Ethylbenzene: produced by Wako Pure Chemical Industries, Ltd.

3. Catalyst Precursor Compound

Ferrocene: produced by ZEON Corporation

4. Other Components:

Thiophene: produced by Wako Pure Chemical Industries, Ltd.

Synthesis of Carbon Fiber

Example 1 a: Ethylene, b: Benzene

In a vertical furnace equipped with a quartz reaction tube 1 (inside diameter: 31 mm, outside diameter: 36 mm, length of heating zone: about 400 mm) shown in FIG. 2, the temperature in the heating zone was elevated to 1,250° C. in an $N_2$ gas stream and then, after stopping the feeding of $N_2$, $H_2$ as a carrier gas was instead passed at 1 NL/min into the reaction tube. When the temperature was stabilized, ethylene (a compound of Group (a)) was mixed in the gas state with $H_2$. A solution obtained by dissolving and mixing benzene (a compound of Group (b)), ferrocene and thiophene was introduced by using a small pump into a vaporizer 4 heated to 200° C. for 10 minutes, to vaporize in an amount, of each component shown in Table 1, and the resulting gas was caused to accompany the mixed gas of $H_2$ and ethylene. In this way, all compounds were fed in the gas state into the reaction tube.

As a result of the reaction, a gray-tinged cobweb-like deposit was produced between the reaction tube bottom and the collector. After lowering the temperature, this deposit was recovered and the carbon recovery was determined by dividing the recovered amount by the amount of carbon contained in the initially used carbon compounds. Furthermore, the cobweb-like product was observed through a scanning electron microscope. The results are shown in Table 1. The product was a fibrous material having an average outside diameter of 150 nm and the carbon recovery was 35%. In this production, the residence time in the low-temperature region of 600° C. or more to less than 1,000° C. was about 0.6 seconds and the residence time in the temperature region of 600° C. or more was about 3.7 seconds.

Example 2 a: Methane, b: Benzene

The reaction was performed according to the method of Example 1 except for using methane in place of ethylene. The results are shown in Table 1. The product was a fibrous material having an average outside diameter of 150 nm and the carbon recovery was 35%.

Example 3 a: Carbon Monoxide, b: Benzene

The reaction was performed according to the method of Example 1 except for using carbon monoxide in place of ethylene. The results are shown in Table 1. The product was a fibrous material having an average outside diameter of 150 nm and the carbon recovery was 34%.

Example 4 a: Carbon Dioxide, b: Benzene

The reaction was performed according to the method of Example 1 except for using carbon dioxide in place of ethylene. The results are shown in Table 1. The product was a fibrous material having an average outside diameter of 150 nm and the carbon recovery was 38%.

Example 5 a: Methanol, b: Benzene

The reaction was performed according to the method of Example 1 except for using no ethylene and introducing methanol by dissolving and mixing it together with benzene, ferrocene and thiophene. The results are shown in Table 1. The product was a fibrous material having an average outside diameter of 150 nm and the carbon recovery was 38%.

Example 6 a: Ethanol, b: Benzene

The reaction was performed according to the method of Example 1 except for using no ethylene and introducing ethanol by dissolving and mixing it together with benzene, ferrocene and thiophene. The results are shown in Table 1. The product was a fibrous material having an average outside diameter of 150 nm and the carbon recovery was 31%.

Example 7 a: Ethylene, b: Toluene

The reaction was performed according to the method of Example 1 except for using toluene in place of benzene. The results are shown in Table 1. The product was a fibrous material having an average outside diameter of 150 nm and the carbon recovery was 36%.

Example 8 a: Ethylene, b: Benzene

The reaction was performed according to the method of Example 1 except for decreasing the amount of ethylene introduced to the value shown in Table 1. The results are shown in Table 1. The product was a fibrous material having an average outside diameter of 150 nm and the carbon recovery was 39%.

Example 9 a: Methane, b: Toluene

The reaction was performed according to the method of Example 1 except for using methane in place of ethylene and using toluene in place of benzene. The results are shown in Table 1. The product was a fibrous material having an average outside diameter of 150 nm and the carbon recovery was 37%.

Example 10 a: Methane, b: p-Xylene

The reaction was performed according to the method of Example 1 except for using methane in place of ethylene and using p-xylene in place of benzene. The results are shown in Table 1. The product was a fibrous material having an average outside diameter of 150 nm and the carbon recovery was 35%.

Example 11 a: Carbon Monoxide, b: Benzene

The reaction was performed according to the method of Example 3 except for changing the amount of carbon monoxide used. The results are shown in Table 1. The product was a fibrous material having an average outside diameter of 150 nm and the carbon recovery was 20%.

Example 12 a: Carbon Monoxide, b: Benzene

The reaction was performed according to the method of Example 3 except for changing the amount of carbon monoxide used. The results are shown in Table 1. The product was a fibrous material having an average outside diameter of 150 nm and the carbon recovery was 27%.

Example 13 a: Methane, b: Benzene

The reaction was performed according to the method of Example 2 except for changing the amounts of methane and benzene used. The results are shown in Table 1. The product was a fibrous material having an average outside diameter of 100 nm and the carbon recovery was 24%.

Example 14 a: Methane, b: Benzene

The reaction was performed according to the method of Example 2 except for changing the amounts of methane and benzene used. The results are shown in Table 1. The product was a fibrous material having an average outside diameter of 80 nm and the carbon recovery was 18%.

Example 15 a: Methane, b: Benzene

The reaction was performed according to the method of Example 2 except for changing the amounts of methane, ferrocene and thiophene used. The results are shown in Table 1. The product was a fibrous material having an average outside diameter of 100 nm and the carbon recovery was 35%.

Example 16 a: Methane, b: Benzene

The reaction was performed according to the method of Example 2 except for changing the amounts of methane, benzene, ferrocene and thiophene used. The results are shown in Table 1. The product was a fibrous material having an average outside diameter of 150 nm and the carbon recovery was 60%.

Comparative Examples 1 and 2

The reaction was performed in the same manner as in Example 1 except for using no ethylene and using only benzene or ethylbenzene as the compound of Group (b). The solid product recovered was mostly spherical carbon particles. The results are shown in Table 1.

Comparative Example 3

Figure 4:
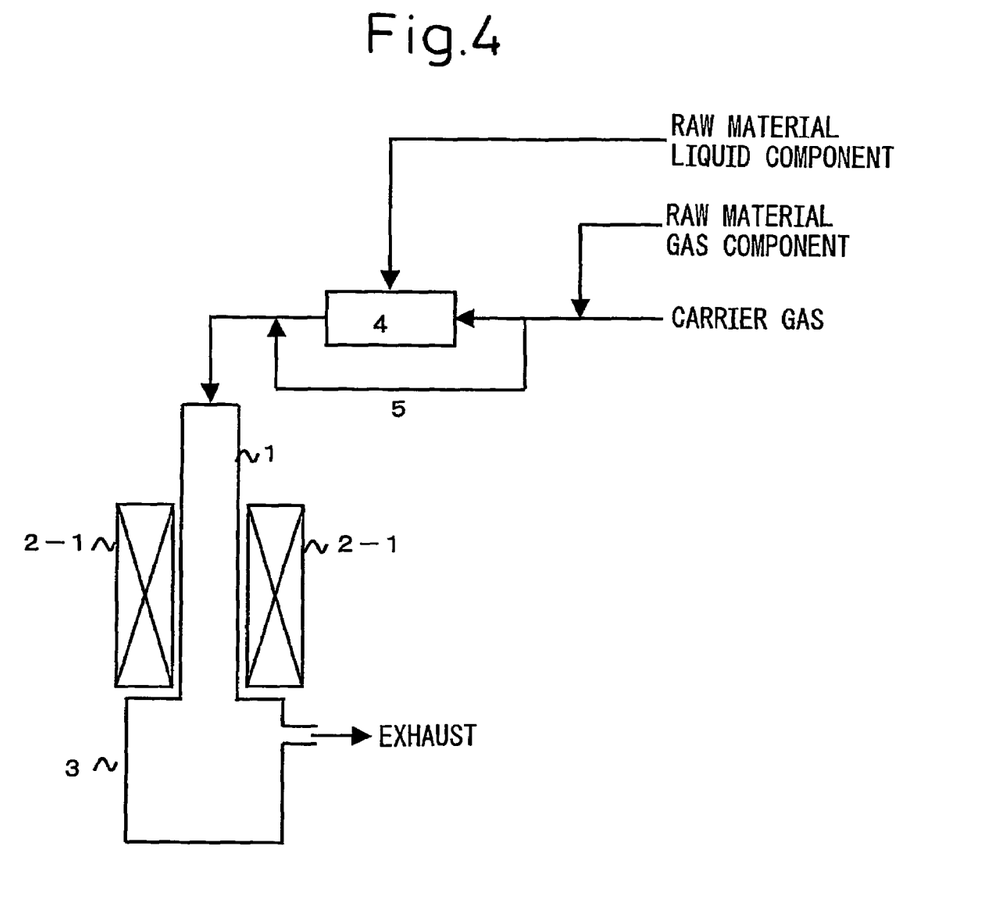
FIG. 4 is a schematic view showing the reaction apparatus used for producing vapor-grown carbon fibers in Comparative Example 3.

In a vertical furnace equipped with a quartz-made reaction tube 1 (inside diameter: 31 mm, outside diameter: 36 mm, length of heating zone: about 400 mm) shown in FIG. 4, the temperature in the heating zone was elevated to 1,250° C. while passing $N_2$ from a by-pass 5 without passing through a vaporizer 4 and then, after stopping the feeding of $N_2$, $H_2$ as a carrier gas was passed at 1 NL/min into the reaction tube from the by-pass 5. When the temperature was stabilized, ethylene in the amount shown in Table 1 was mixed in the gas state with the carrier gas. Thereafter, the mixed gas of carrier gas and ethylene introduced from the by-pass 5 was partially caused to diverge into the vaporizer 4 previously charged with ferrocene and heated to 140° C., and passed at a flow rate of 33 ml/min. Furthermore, thiophene in the amount shown in Table 1 was introduced into the vaporizer (raw material liquid component), and ferrocene and thiophene each in the gas state were allowed to accompany the mixed gas of carrier gas and ethylene and finally joined with the by-pass 5, thereby feeding all compounds in a gas state into the reaction tube.

As for the temperature of the vaporizer 4 and the flow rate of the mixed gas of carrier gas and ethylene to be injected, the conditions capable of introducing ferrocene in the amount shown in Table 1 were previously examined and the determined conditions were used.

In this Comparative Example, a liquid component (for example, benzene) for undertaking a role of dissolving ferrocene which is a solid, and feeding it to the vaporizer 4 was not used. Therefore, ferrocene was previously charged into the vaporizer and sublimated. The thiophene is a liquid but this was not used in an sufficient amount to dissolve the solid ferrocene.

The solid contents recovered were mostly a spherical material, and a fibrous material was only partially observed.

TABLE 1

|  | Group (a) | | Group (b) | | Amount of Ferrocene Introduced, mmol/min | Amount of Thiophene Introduced, mmol/min |
| --- | --- | --- | --- | --- | --- | --- |
|  | Compound | Amount Introduced, mmol/min | Compound | Amount Introduced, mmol/min | | |
| Example 1 | ethylene | 0.4 | benzene | 1.3 | 0.0005 | 0.0007 |
| Example 2 | methane | 0.8 | benzene | 1.3 | 0.0005 | 0.0007 |
| Example 3 | CO | 0.8 | benzene | 1.3 | 0.0005 | 0.0007 |
| Example 4 | $CO_2$ | 0.8 | benzene | 1.3 | 0.0005 | 0.0007 |
| Example 5 | methanol | 0.8 | benzene | 1.3 | 0.0005 | 0.0007 |
| Example 6 | ethanol | 0.4 | benzene | 1.3 | 0.0005 | 0.0007 |
| Example 7 | ethylene | 0.4 | toluene | 1.1 | 0.0005 | 0.0007 |
| Example 8 | ethylene | 0.04 | benzene | 1.3 | 0.0005 | 0.0007 |
| Example 9 | methane | 0.8 | toluene | 1.1 | 0.0005 | 0.0007 |
| Example 10 | methane | 0.8 | p-xylene | 1.0 | 0.0005 | 0.0007 |
| Example 11 | CO | 8.0 | benzene | 1.3 | 0.0005 | 0.0007 |
| Example 12 | CO | 4.0 | benzene | 1.3 | 0.0005 | 0.0007 |
| Example 13 | methane | 4.0 | benzene | 0.7 | 0.0005 | 0.0007 |
| Example 14 | methane | 6.4 | benzene | 0.27 | 0.0005 | 0.0007 |
| Example 15 | methane | 0.8 | benzene | 1.3 | 0.006 | 0.01 |
| Example 16 | methane | 0.8 | benzene | 6.7 | 0.028 | 0.05 |
| Comparative Example 1 | — | — | benzene | 1.3 | 0.0005 | 0.0007 |
| Comparative Example 2 | — | — | ethylbenzene | 1.0 | 0.0005 | 0.0007 |
| Comparative Example 3 | ethylene | 4.0 | — | — | 0.020 | 0.016 |

|  | A/(A + B) | D/A | D/B | D/C | Carbon Recovery | Shape of Produced Carbon Solid Content |
| --- | --- | --- | --- | --- | --- | --- |
| Example 1 | 0.09 | 0.0006 | 0.00006 | 0.00005 | 35% | fibrous material with fiber diameter of about 150 nm |
| Example 2 | 0.09 | 0.0006 | 0.00006 | 0.00005 | 35% | fibrous material with fiber diameter of about 150 nm |
| Example 3 | 0.09 | 0.0006 | 0.00006 | 0.00005 | 34% | fibrous material with fiber diameter of about 150 nm |
| Example 4 | 0.09 | 0.0006 | 0.00006 | 0.00005 | 38% | fibrous material with fiber diameter of about 150 nm |
| Example 5 | 0.09 | 0.0006 | 0.00006 | 0.00005 | 38% | fibrous material with fiber diameter of about 150 nm |
| Example 6 | 0.09 | 0.0006 | 0.00006 | 0.00005 | 31% | fibrous material with fiber diameter of about 150 nm |
| Example 7 | 0.09 | 0.0006 | 0.00006 | 0.00005 | 36% | fibrous material with fiber diameter of about 150 nm |
| Example 8 | 0.01 | 0.006 | 0.00006 | 0.00006 | 39% | fibrous material with fiber diameter of about 150 nm |
| Example 9 | 0.09 | 0.0006 | 0.00006 | 0.00005 | 37% | fibrous material with fiber diameter of about 150 nm |
| Example 10 | 0.09 | 0.0006 | 0.00006 | 0.00005 | 35% | fibrous material with fiber diameter of about 150 nm |
| Example 11 | 0.5 | 0.00006 | 0.00006 | 0.00003 | 20% | fibrous material with fiber diameter of about 150 nm |
| Example 12 | 0.3 | 0.0001 | 0.00006 | 0.00004 | 27% | fibrous material with fiber diameter of about 150 nm |
| Example 13 | 0.5 | 0.0001 | 0.0001 | 0.00006 | 24% | fibrous material with fiber diameter of about 100 nm |
| Example 14 | 0.8 | 0.00008 | 0.0003 | 0.00006 | 18% | fibrous material with fiber diameter of about 80 nm |
| Example 15 | 0.09 | 0.007 | 0.0007 | 0.0006 | 35% | fibrous material with fiber diameter of about 100 nm |
| Example 16 | 0.02 | 0.035 | 0.0007 | 0.0007 | 60% | fibrous material with fiber diameter of about 150 nm |
| Comparative Example 1 | 0 | — | 0.00006 | 0.00006 | 30% | spherical material |
| Comparative Example 2 | 0 | — | 0.00006 | 0.00006 | 21% | spherical material |
| Comparative Example 3 | 1 | 0.003 | — | 0.003 | 24% | mainly spherical material, partially fibrous material with fiber diameter of about 30 nm |

A: The number of carbon atoms contained in the compound of Group (a).
B: The number of carbon atoms contained in the compound of Group (b).
C: The number of all carbon atoms.
D: The number of atoms of an element as the catalyst.

INDUSTRIAL APPLICATION

According to the present invention, both a compound of Group (a) and a compound of Group (b) are used as the carbon source, so that carbon fibers can be obtained at a high productivity with a very small catalytic amount.

The invention claimed is:

1. A method for producing vapor-grown carbon fibers having a diameter of 10 nm to 150 nm, consisting essentially of contacting a carbon compound with a catalyst and/or a catalyst precursor compound in a heating zone to produce carbon fibers in a vapor phase, wherein the carbon compound is a combination of at least one compound selected from compounds in the following Group (a) and at least one compound selected from compounds in the following Group (b):

Compound of Group (a):
  carbon compounds having no benzene ring structure within the molecule Compound of Group (b):
  aromatic compounds, the ratio of the number of atoms of an element as the catalyst in raw materials to the number of all carbon atoms is:
  (number of atoms of element as catalyst)/(number of all carbon atoms)=0.000005 to 0.0015, the compound of Group (a) and the compound of Group (b) satisfy the condition:
  [number of carbon atoms contained in compound of Group (a)]/[number of carbon atoms contained in compound of Group (a)+number of carbon atoms contained in compound of Group (b)]=0.001 to 0.9, and the residence time in a temperature region of 600° C. or more is 30 seconds or less.

2. The production method of vapor-grown carbon fibers as claimed in claim 1, wherein the ratio of the number of atoms of an element as the catalyst in raw materials to the number of all carbon atoms is:
  (number of atoms of element as catalyst)/(number of all carbon atoms)=0.00001 to 0.001.

3. The production method of vapor-grown carbon fibers as claimed in claim 1, wherein the ratio of the number of atoms of an element as the catalyst in raw materials to the number of carbon atoms contained in the compound of Group (b) is:
  (number of atoms of element as catalyst)/(number of carbon atoms contained in compound of Group (b))=0.000005 to 0.0015.

4. The production method of vapor-grown carbon fibers as claimed in claim 3, wherein the ratio of the number of atoms of an element as the catalyst in raw materials to the number of carbon atoms contained in the compound of Group (b) is:
  (number of atoms of element as catalyst)/(number of carbon atoms contained in compound of Group (b))=0.00001 to 0.001.

5. The production method of vapor-grown carbon fibers as claimed in claim 1, wherein the ratio of the number of atoms of an element as the catalyst in raw materials to the number of carbon atoms contained in the compound of Group (a) is:
  (number of atoms of element as catalyst)/(number of carbon atoms contained in compound of Group (a))=0.00001 to 0.1.

6. The production method of vapor-grown carbon fibers as claimed in claim 5, wherein the ratio of the number of atoms of an element as the catalyst in raw materials to the number of carbon atoms contained in the compound of Group (a) is:
  (number of atoms of element as catalyst)/(number of carbon atoms contained in compound of Group (a))=0.0001 to 0.1.

7. The production method of vapor-grown carbon fibers as claimed in claim 1, wherein the ratio of the number of atoms of an element as the catalyst in raw materials to the number of carbon atoms contained in the compound of Group (b) is:
  (number of atoms of element as catalyst)/(number of carbon atoms contained in compound of Group (b))=0.000005 to 0.0015, and the ratio of the number of atoms of an element as the catalyst in raw materials to the number of carbon atoms contained in the compound of Group (a) is:
  (number of atoms of element as catalyst)/(number of carbon atoms contained in compound of Group (a))=0.00001 to 0.1.

8. The production method of vapor-grown carbon fibers as claimed in claim 7, wherein the ratio of the number of atoms of an element as the catalyst in raw materials to the number of carbon atoms contained in the compound of Group (b) is:
  (number of atoms of element as catalyst)/(number of carbon atoms contained in compound of Group (b))=0.00001 to 0.001, and the ratio of the number of atoms of an element as the catalyst in raw materials to the number of carbon atoms contained in the compound of Group (a) is:
  (number of atoms of element as catalyst)/(number of carbon atoms contained in compound of Group (a)) 0.0001 to 0.1.

9. The production method of vapor-grown carbon fibers as claimed in claim 1, wherein the compound of Group (a) and the compound of Group (b) are fed to the heating zone of a reactor at a ratio satisfying the condition:
  (number of carbon atoms contained in compound of Group (a))/(number of carbon atoms contained in compound of Group (a)+number of carbon atoms contained in compound of Group (b))=0.003 to 0.5.

10. The production method of vapor-grown carbon fibers as claimed in claim 1, wherein the compound of Group (a) and the compound of Group (b) are fed to the heating zone of a reactor at a ratio satisfying the condition:
  (number of carbon atoms contained in compound of Group (a))/(number of carbon atoms contained in compound of Group (a)+number of carbon atoms contained in compound of Group (b))=0.005 to 0.2.

11. The production method of vapor-grown carbon fibers as claimed in claim 1, wherein the compound of Group (a) is at least one compound selected from the group consisting of carbon monoxide, carbon dioxide, a saturated aliphatic compound and a saturated alicyclic compound.

12. The production method of vapor-grown carbon fibers as claimed in claim 1, wherein the compound of Group (a) is at least one compound selected from the group consisting of carbon monoxide, carbon dioxide, a saturated aliphatic hydrocarbon, a saturated aliphatic alcohol, a saturated aliphatic amine, a saturated aliphatic thiol, a saturated aliphatic ester, a saturated aliphatic ether, a saturated aliphatic aldehyde, a saturated aliphatic carboxylic acid, a saturated alicyclic hydrocarbon, a saturated alicyclic alcohol, a saturated alicyclic amine, a saturated alicyclic thiol, a saturated alicyclic ester, a saturated alicyclic ether, a saturated alicyclic aldehyde and a saturated alicyclic carboxylic acid.

13. The production method of vapor-grown carbon fibers as claimed in claim 1, wherein the compound of Group (a) has a boiling point (at 1 atm) of less than 180° C.

14. The production method of vapor-grown carbon fibers as claimed in claim 1, wherein the compound of Group (a) is at least one compound selected from the group consisting of carbon monoxide, carbon dioxide, methanol, ethanol, methane, ethane, propane and butane.

15. The production method of vapor-grown carbon fibers as claimed in claim 1, wherein the compound of Group (b) is at least one compound selected from aromatic hydrocarbons.

16. The production method of vapor-grown carbon fibers as claimed in claim 1, wherein the compound of Group (b) is at least one compound selected from the group consisting of benzene, toluene, xylene, ethylbenzene, styrene and cumene.

17. The production method of vapor-grown carbon fibers as claimed in claim 1, wherein the compound of Group (a) is at least one compound selected from the group consisting of carbon monoxide, carbon dioxide, methanol, ethanol and methane and the compound of Group (b) is at least one compound selected from the group consisting of benzene, toluene and xylene.

18. The production method of vapor-grown carbon fibers as claimed in claim 1, wherein raw materials pass through a low-temperature region of 600° C. to less than 1,000° C. and a high-temperature region of 1,000° C. or more.

19. The production method of vapor-grown carbon fibers as claimed in claim 18, wherein the residence time of the raw material composition containing the carbon compound and the catalyst and/or the catalyst precursor compound in the low-temperature region is 0.5 seconds or more.

20. The production method of vapor-grown carbon fibers as claimed in claim 18, wherein the compound of Group (a) is introduced into the low-temperature region and thereafter, the compound of Group (b) is introduced into the high-temperature region.

21. The production method of vapor-grown carbon fibers as claimed in claim 1, wherein the compound of Group (a), the compound of Group (b) and the catalyst precursor are fed each in the gas state to the heating zone.

22. The production method of vapor-grown carbon fibers as claimed in claim 1, wherein the catalyst precursor compound contains at least one metal selected from Groups 3, 5, 6, 8, 9 and 10 in the Periodic Table in which the groups are numbered 1 to 18.

23. The production method of vapor-grown carbon fibers as claimed in claim 1, wherein the gas after reaction is entirely or partially circulated and reused.

24. The production method of vapor-grown carbon fibers as claimed in claim 1, wherein carbon fibers having an average fiber diameter of 10 nm or more are produced.

* * * * *